Patented Aug. 10, 1937

2,089,470

UNITED STATES PATENT OFFICE 2,089,470

IMPROVED MARGARINE

Albert K. Epstein and Benjamin R. Harris, Chicago, Ill.

No Drawing. Application March 11, 1936, Serial No. 68,192. Renewed November 6, 1936

7 Claims. (Cl. 99—123)

Our invention relates in general to margarine, particuarly to methods of producing improved and non-weeping margarine.

The principal object of our present invention is the provision of an improved margarine.

Another object is to facilitate the incorporation in margarine of certain types of non-weeping agents.

A further object is to utilize in margarine the types of materials described in our prior patent application, Serial No. 58,540 filed January 10, 1936.

Another object is to produce an improved margarine by the incorporation therein of considerably smaller proportions of certain materials than have been capable of incorporation in margarine heretofore with good results.

Other specific objects and features of our invention will be apparent from the following detailed description.

Our present invention concerns itself primarily with the incorporation in margarine of mixtures of diglycerides of relatively high molecular weight fatty acids and lecithin. The lecithin employed is primarily of commercial grade, but substantially pure lecithin may be employed if desired.

Commercial lecithins come to the market in the form of a viscous mass, which consists usually of approximately 20% to 35% of a vegetable oil and the remainder lecithin and lecithin-like materials which occur in the plant from which the lecithin extract has been made. Thus, for example, commercial soybean lecithin usually contains approximately 30% of soybean oil and approximately 70% of lecithin and lecithin-like materials. While this product swells in water, it is very difficultly dispersible in water. Great difficulties are encountered in dispersing very small proportions of such a lecithin substance in a plastic margarine. The use of lecithin in margarine as an antispattering substance is known; however, in order to reduce the spattering of margarine substantially by the use of lecithin, approximately $\frac{7}{10}$% of the lecithin product is required. It is practically impossible to disperse this proportion of the lecithin substance uniformly and homogeneously into the plastic mass of margarine, as it is not soluble nor readily dispersible in the plastic margarine emulsion.

Diglycerides of relatively high molecular weight fatty acids, for example distearine, contain one free hydroxy group, and the presence of this free hydroxy group would be expected to cause the diglyceride to function as an antiweeping agent when incorporated into margarine. Here again, however, substantially the same difficulty obtains as in the case of lecithins; that is to say, the diglyceride is dispersible only with considerable difficulty in the plastic margarine mass, and, insofar as methods heretofore suggested are concerned, a uniform and satisfactory dispersion of this type of material in plastic margarine emulsions has been substantially impossible—certainly not commercially feasible.

We have found that an intimate mixture of a commercial lecithin and a substantial proportion of a di-fatty acid glyceride can be dispersed in aqueous material to form a paste containing a suitable proportion of aqueous material, such as water or milk, as will be explained, and that this paste can then be readily and easily kneaded or blended into a plastic margarine emulsion and excellent results obtained, in that both the lecithin and the diglycerides will be uniformly dispersed, a commercially satisfactory margarine will be produced, and the proportions of lecithin and diglycerides employed may be decreased without any sacrifice in antispattering and antiweeping functions in the margarine.

Thus, for example, a diglyceride of fatty acids of partially hydrogenated cotton seed oil having an iodine number of about 60 can be dispersed in a plastic margarine mass sufficiently to be effective as an antiweeping agent only with extreme difficulty, or such dispersion, particularly from a commercial viewpoint, might be considered entirely impossible. If, however, such a diglyceride be treated with a substantial proportion of commercial lecithin, an aqueous emulsion or paste can be formed which is easily introduced and blended or kneaded into a plastic margarine mass. When so introduced, proportions of $\frac{2}{10}$% to $\frac{1}{10}$% of such a diglyceride will function to produce adequate antiweeping properties in a relatively high moisture content margarine, and the margarine will also possess some antispattering properties, because of the presence of the lecithin, the extent to which spattering is reduced depending, of course, upon the proportion of lecithin employed.

Example 1

100 parts of commercial soybean lecithin containing aproximately 30% to 35% of soybean oil and 60% to 65% of lecithin are combined with 100 part of commercial distearine, by melting the two ingredients together. To this mixture is then added 100 parts of water, while the ingredients are still in a melted condition, and stirred while cooling until a uniform paste is formed. This paste can be further diluted with water or milk until an aqueous, uniform emulsion is obtained containing 25% of the lecithin distearine mixture, and 75% of aqueous material. One pound of this aqueous dispersion is then added to 100 pounds of plastic margarine and kneaded or blended on the kneading machine until the addition agents are thoroughly dispersed. The amount of kneading or blending to which the margarine should be subjected for a thorough dispersion of the paste in general can be determined by carrying on the operation until the plastic margarine product is substantially dry and no free moisture is visible.

Example 2

20 parts of commercial soybean lecithin or lecithin derived from any other source such as peanuts, containing approximately 30% to 40% of vegetable oil with 60% to 70% of lecithin-like materials, are melted together with 80 parts of commercial distearine prepared from commercial stearic acid containing some palmitic and oleic acids, esterified with glycerine. To this preparation, while still warm, is added sufficient aqueous material to make a paste containing 50% of moisture. The paste is stirred while cooling until a uniform, pasty product is obtained. One pound of this product may be further diluted with aqueous material and kneaded or blended into 100 pounds of plastic margarine. If desired, additional liquids such as sweet milk, ripened milk or water and other addition agents such as salt or benzoate may be added to the plastic margarine while kneading it together with the dispersed addition agents.

The above margarine will contain approximately $\frac{1}{10}$% of lecithin and approximately $\frac{3}{10}$ to $\frac{4}{10}$% of diglyceride uniformly dispersed, which will produce a non-leaky margarine containing the required amount of aqueous material. This margarine will have the distearine uniformly dispersed in such a manner as to function effectively as an anti-weeping agent.

The diglycerides employed may be those formed from a single fatty acid or a combination of various fatty acids found in vegetable or animal oils. For example, we may partially hydrogenate cottonseed oil to an iodine number of about 65 and re-esterify the same with glycerine to produce a product which is substantially a diglyceride. Whether the product is made from commercial stearic acid or from a mixture of fatty acids or whether it is made by re-esterification with glycerine to produce substantial amounts of diglycerides, it is normally difficultly dispersible uniformly in plastic margarine but the pretreatment with a proportion of lecithin as outlined above makes the product more potent and accentuates the hydrophillic property of the OH group in the molecule.

In the preparation of margarine for baking purposes, a larger proportion of the lecithin diglyceride may be added to the plastic margarine. Thus, for example, from 2% to 10% of the paste containing 50% moisture as illustrated in Examples 1 and 2, may be kneaded into the plastic margarine. In such cases the margarine is prepared with the minimum amount of moisture and the paste added to the plastic margarine on the blender and blended in the usual manner. If it is necessary, the paste may be diluted with a small proportion of aqueous liquids. If desired, various proportions of diglyceride and lecithin may be melted together having either a substantially larger proportion of diglyceride or equal proportions of diglyceride with the lecithin.

Preparations as low as 10% lecithin are useful in preparing the lecithin diglyceride fatty mixture which can be subsequently dispersed in aqueous material. Softer diglycerides such as those produced from oleic acid or fatty acids containing substantial amounts of oleic acids, or the fatty acids of cottonseed oil or corn oil may be used. The fatty acid content of lard and coconut oil may also be used as the fatty acid portions of the diglycerides.

In the preparation of the diglyceride we prefer to use higher fatty acids which contain more than 12 carbon atoms. In place of commercial lecithin as outlined above, other lecithin preparations may be used from which a substantial proportion of the indigenous vegetable has been removed and replaced with another oil or fat or glyceride of higher fatty acid.

By means of our invention, a relatively smaller proportion of a commercial lecithin product is made to act more potently in the margarine and a ready means is provided for dispersing relatively very small amounts of lecithin uniformly in plastic margarine. In addition, whereas heretofore it was practically impossible to disperse a diglyceride in proportions of $\frac{1}{10}$ to $\frac{5}{10}$% or even as much as 1% uniformly in a plastic mass, because the product has hydrophillic properties of a relatively feeble nature, still by our invention these hydrophillic properties seem to be accentuated by the addition of the lecithin which in itself is hard to disperse; and dispersions of smaller proportions of the diglyceride in margarine with larger proportions of aqueous liquids where desired are accomplished readily, and relatively smaller proportions of the diglycerides are much more effective in reducing leaking or weeping of the margarine.

It is to be understood that when we refer to lecithin or lecithin preparations, we by no means limit ourselves to the particular types of lecithin products from the particular sources identified hereinabove in the illustrative examples. Lecithin preparations obtained from other sources may be used, and in any case the advantages and functions described are obtainable.

What we claim as new and desire to protect by Letters Patent of the United States is:

1. The method of producing an improved non-weeping margarine which comprises forming a plastic emulsion of oleaginous and aqueous materials, and then blending into said plastic margarine emulsion a proportion of an aqueous paste, said aqueous paste comprising an intimate mixture of lecithin and a diglyceride of a relatively high molecular weight fatty acid dispersed in an aqueous liquid.

2. The method of producing an improved non-weeping margarine which comprises forming a plastic emulsion of oleaginous and aqueous materials, and then blending into said plastic margarine emulsion a proportion of an aqueous paste, said aqueous paste comprising an intimate mixture of lecithin and a diglyceride of a relatively high molecular weight fatty acid dispersed in an aqueous liquid, the amount of said aqueous paste blended into the margarine being such as to introduce into the margarine on a dry basis approximately .2% to .5% of diglyceride and a relatively somewhat smaller proportion of lecithin.

3. The method of utilizing a diglyceride of a relatively high molecular weight fatty acid as an anti-weeping agent in plastic margarine emulsions, which comprises intimately mixing said diglyceride and a proportion of lecithin, forming an aqueous paste of said mixture, and blending a proportion of such paste into the said plastic margarine emulsion.

4. An improved non-weeping margarine comprising an emulsion of oleaginous and aqueous material having intimately dispersed therein lecithin and a diglyceride of a relatively high molecular weight fatty acid, the proportion of diglyceride in the margarine being not substantially greater than 1%.

5. An improved non-weeping margarine comprising an emulsion of oleaginous and aqueous material having intimately dispersed therein lecithin and a diglyceride of a relatively high molecular weight fatty acid, the proportion of lecithin being relatively smaller than the proportion of diglyceride.

6. The method of producing an improved non-weeping margarine, which comprises forming a plastic emulsion of oleaginous and aqueous materials, and blending into the plastic emulsion a mixture of lecithin and a diglyceride of a relatively high molecular weight fatty acid, the proportion of lecithin being sufficient to disperse the diglyceride.

7. An improved non-weeping margarine comprising an emulsion of oleaginous and aqueous material, having intimately dispersed therein lecithin and a diglyceride of a relatively high molecular weight fatty acid, the proportion of diglyceride in the margarine being not substantially greater than 1%, and the proportion of lecithin being relatively much smaller than the proportion of said diglyceride and sufficient to disperse the diglyceride.

ALBERT K. EPSTEIN.
BENJAMIN R. HARRIS.